United States Patent [19]

Koyama et al.

[11] Patent Number: 5,010,041

[45] Date of Patent: Apr. 23, 1991

[54] COLORED LOW-EXPANSION TRANSPARENT GLASS CERAMIC

[75] Inventors: Akihiro Koyama; Keiji Kitamura; Nobuyuki Yamamoto, all of Osaka, Japan

[73] Assignee: Nippon Sheet Glass Co., Ltd., Osaka, Japan

[21] Appl. No.: 390,771

[22] Filed: Aug. 8, 1989

[30] Foreign Application Priority Data

Aug. 17, 1988 [JP] Japan .................. 63-204164

[51] Int. Cl.$^5$ .................. C03C 10/12; C03C 10/14; C03C 3/11
[52] U.S. Cl. .................. 501/4; 501/7; 501/56; 501/69
[58] Field of Search .................. 501/4, 7, 69, 56

[56] References Cited

U.S. PATENT DOCUMENTS 3,970,463 7/1976 Planchock et al. .................. 501/4
4,285,728 8/1981 Babcock et al. .................. 501/10
4,526,872 7/1985 Andrieu et al. .................. 501/4

FOREIGN PATENT DOCUMENTS 47-1318 1/1972 Japan .................. 501/4

Primary Examiner—Mark L. Bell
Attorney, Agent, or Firm—Kanesaka and Takeuchi

[57] ABSTRACT

A colored low-expansion transparent glass ceramic comprising 100 parts by weight of a base glass (a) having the following composition, the following coloring components (b) and the following auxiliary coloring component (c) mixed thereto in the following ratio, and in that the principal crystalline phase is $\beta$-quartz solid solution.

(a) Base glass

|  | (weight %) |
|---|---|
| $LiO_2$ | 3.5 to 5.5 |
| $Na_2O$ | 0 to 4.0 |
| $K_2O$ | 0 to 4.0 |
| $Na_2O + K_2O$ | 0.5 to 4.0 |
| MgO | 0.1 to 3.0 |
| $Al_2O_3$ | 20.5 to 23.0 |
| $SiO_2$ | 60.0 to 68.5 |
| $TiO_2$ | 1.0 to 7.0 |
| $ZrO_2$ | 0 to 3.5 |
| $TiO_2 + ZrO_2$ | 3.5 to 7.0 |
| $P_2O_5$ | 0 to 4.0 |

(b) Coloring components

|  | (part by weight) |
|---|---|
| CoO | 0 to 0.02 |
| $Cr_2O_3$ | 0 to 0.05 |
| $MoO_3$ | 0 to 0.04 |
| NiO | 0 to 0.075 |

(c) Auxiliary coloring component
At least one selected from the group consisting of

|  | (part of weight) |
|---|---|
| Cl | 0 to 0.6 |
| Br | 0 to 0.4, and |
| I | 0 to 0.03 |

The total amount of auxiliary component is 0.002 to 0.7 part by weight.

In order to produce such glass ceramic, a raw material so prepared as to produce a glass ceramic having a composition comprising 100 parts by weight of the base glass (a) having the above-described composition, the coloring components (b) and the auxiliary coloring components (c) mixed thereto in the above-described ratio is melted and cooled and the thus-obtained glass ceramic is heat treated so as to form $\beta$-quartz solid solution crystals as the principal crystalline phase.

10 Claims, No Drawings

COLORED LOW-EXPANSION TRANSPARENT GLASS CERAMIC

FIELD OF THE INVENTION AND RELATED ART STATEMENT

The present invention relates to a colored low-expansion transparent glass ceramic and a method of producing the same and, more particularly, to a colored low-expansion transparent glass ceramic having a very low coefficient of expansion and excellent transparency and which is useful for building and automotive windowpanes, and a method of producing the same.

Colored glass used for buildings, vehicles and the like are generally produced by adding a coloring component such as $Fe_2O_3$, CoO, NiO and Se to ordinary soda lime glass. Since such kind of colored glass has a gentle tone such as gray and bronze and exerts an air-conditioning load alleviating effect due to the high heat-ray absorptivity, it is chiefly used for windowpanes of buildings and the like. However, since such soda lime colored glass has a large coefficient of expansion, if the heat-ray transmittance is excessively lowered by addition of a coloring component, the absorption of solar radiation is increased, thereby involving a fear of producing thermal cracking. Thermal cracking is also apt to be produced when a fire breaks out.

A fireproof wired glass can prevent a danger which may be caused by the glass dropping due to thermal cracking, but it can only prevent the cracked pieces of glass from dropping and cannot prevent thermal cracking itself. In addition, the wire of wired glass impairs the aesthetic views and is unfavorable from the point of view of design.

For these reasons, development of colored glass which itself is resistant to cracking without the help of a wire is strongly demanded.

Cracking of glass is generally produced by a stress caused by a difference in the expansion of the glass due to nonuniformity of temperature. Therefore if glass having a small coefficient of expansion is used, such thermal cracking is prevented. As one of the glasses having a small coefficient of expansion, borosilicate glass is conventionally known, but the coefficient of expansion is only about ½ of that of soda lime glass, so that a sufficient thermal cracking preventive effect cannot be obtained.

Another low-expansion glass is $Li_2O$-$Al_2O_3$-$SiO_2$ transparent glass ceramic. Various ceramics of this type have been investigated and some of them have a coefficient of expansion of not more than 1/10 of that of soda lime glass. Colored ceramics produced by adding a coloring component to such $Li_2O$-$Al_2O_3$-$SiO_2$ glass are disclosed in Japanese Patent Publication No. 38090/1978 and Japanese Patent Application No. 7001/1987. These colored ceramics use oxides of transition metals as the coloring component, the former using $MnO_2$, CoO and NiO and the latter $V_2O_5$, NiO, CoO and $Fe_2O_3$. However, the colored glass ceramics disclosed in Japanese Patent Publication No. 38090/1978 and Japanese Patent Application No. 7001/1987 assume dark red and a colored glass ceramic having a gentle tone such as gray and bronze has not been obtained.

OBJECT AND SUMMARY OF THE INVENTION

Accordingly, it is an object of the present invention to eliminate the above-described problems in the prior art and to provide an $Li_2O$-$Al_2O_3$-$SiO_2$ low-expansion transparent glass ceramic having a very small coefficient of expansion and excellent thermal cracking resistance when it is used for building and automotive windowpanes and having a gentle tone, and a method of producing such ceramic.

A colored low-expansion transparent glass ceramic according to the present invention is characterized in that it has a composition comprising 100 parts by weight of a base glass (a) having the following composition, the following coloring components (b) and the following auxiliary coloring component (c) mixed thereto in the following ratio, and in that the principal crystalline phase is composed of $\beta$-quartz solid solution.

(a) Base glass

|  | (weight %) |
| --- | --- |
| $LiO_2$ | 3.5 to 5.5 |
| $Na_2O$ | 0 to 4.0 |
| $K_2O$ | 0 to 4.0 |
| $Na_2O + K_2O$ | 0.5 to 4.0 |
| MgO | 0.1 to 3.0 |
| $Al_2O_3$ | 20.5 to 23.0 |
| $SiO_2$ | 60.0 to 68.5 |
| $TiO_2$ | 1.0 to 7.0 |
| $ZrO_2$ | 0 to 3.5 |
| $TiO_2 + ZrO_2$ | 3.5 to 7.0 |
| $P_2O_5$ | 0 to 4.0 |

(b) Coloring components

|  | (part by weight) |
| --- | --- |
| CoO | 0 to 0.02 |
| $Cr_2O_3$ | 0 to 0.05 |
| $MoO_3$ | 0 to 0.04 |
| NiO | 0 to 0.075 |

(c) Auxiliary coloring component
At least one selected from the group consisting of

|  | (part of weight) |
| --- | --- |
| Cl | 0 to 0.6 |
| Br | 0 to 0.4, and |
| I | 0 to 0.03 |

The total amount of auxiliary component is 0.0002 to 0.7 part by weight.

The method of producing a colored low-expansion transparent glass ceramic according to the present invention is characterized in that a raw material so prepared as to produce a ceramic having a composition comprising 100 parts by weight of the base glass (a) having the above-described composition, the coloring components (b) and the auxiliary coloring components (c) mixed thereto in the above-described ratio is melted and cooled and the thus-obtained ceramic is heat treated so as to form $\beta$-quartz solid solution crystals as the principal crystalline phase.

DESCRIPTION OF THE PREFERRED EMBODIMENTS

The present invention will be explained in detail hereinunder.

"%" means "wt%" and "part" means "part by weight" in the following.

The principal crystal phase of the transparent glass ceramic of the present invention is composed of $\beta$-quartz solid solution. Unless such principal crystals are formed, the intended transparent glass ceramic having a very small coefficient of expansion cannot be obtained.

Such a glass ceramic of the present invention can be obtained by a method of, for example, heat treating a ceramic obtained by melting a raw material so prepared as to produce a glass having the composition consisting of the above-described components (a) to (c) in accordance with a method of the present invention. The optimum temperature for heat treatment is different depending upon the composition, but generally 800° to 900° C. As the heat treatment, one-stage heat treatment in which the ceramic is immediately held at 800° to 900° C. for about 30 minutes to 4 hours may be adopted, but in order to obtain a glass ceramic having more excellent transparency, two or more-stage heat treatment is preferably adopted in which first-stage heat treatmentis carried out in a comparatively low temperature range such as 700 to 800° C. for about 30 minutes to 4 hours, and thereafter second-stage heat treatment is carried out in a comparatively high temperature range such as 800° to 900° C. for about 30 minutes to 4 hours. Such two or more-stage heat treatment reduces the size of the crystal grains and lowers scattering, thereby producing a glass ceramic having a more excellent transparency.

The coefficient of linear expansion in a temperature range of 100° to 800° C. of the thus-obtained glass ceramic of the present invention is ordinarily $-10 \times 10^{-7}$ to $10 \times 10^{-7} (K^{-1})$, which value is about 1/10 of that of soda lime glass. Thus, the glass ceramic of the present invention is very excellent in thermal cracking resistance.

The reason why the base glass of a glass ceramic of the present invention is restricted to the base glass (a) having the above-described composition will be explained in the following.

$Li_2O$:

If $Li_2O$ is more than 5.5%, the coefficient of expansion is reduced and the opacity is increased, thereby lowering the transparency. On the other hand, if it is less than 3.5%, the opacity is increased thereby lowering the transparency and making the glass difficult to melt and mold. Therefore the content of $Li_2O$ is set at 3.5 to 5.5%.

$Na_2O$:

$Na_2O$, which enhances the solubility of a glass and increases the coefficient of expansion by lowering the crystallinity, is an effective ingredient for adjusting the coefficient of expansion, but if $Na_2O$ is more than 4.0%, the opacity is increased, thereby lowering the transparency. Therefore the content of $Na_2O$ is set at 0 to 4.0%.

$K_2O$:

$K_2O$, which enhances the solubility of the glass and increased the coefficient of expansion by lowering the crystallinity, is an effective ingredient for adjusting the coefficient of expansion, but if $K_2O$ is more than 4.0%, the opacity is increased,,thereby lowering the transparency. Therefore the content of $K_2O$ is set at 0 to 4.0%.

$Na_2O + K_2O$:

If the total amount of $Na_2O + K_2O$ is more than 4.0%, the opacity is increased, thereby lowering the transparency. On the other hand, if it is less than 0.5%, the solubility of the glass is apt to be lowered. Therefore the content of $Na_2O + K_2O$ is set at 0.5 to 4.0%.

MgO:

Addition of even a small amount of MgO is effective for reducing the opacity and enhancing the transparency by making the crystal grains finer. Since MgO dissolves in a crystal in the form of a solid and increases the thermal expansion, it is effective for adjusting the coefficient of expansion. If MgO is less than 0.1%, it is insufficient for making the crystal grains finer and increases the opacity, thereby lowering the transparency. On the other hand, if it is more than 3.0%, a cracking is apt to be produced during crystallization. Therefore the content of MgO is set at 0.1 to 3.0%. Especially, in order to increase the transparency, the content of MgO is preferably set at not more than 2%.

$Al_2O_3$:

If $Al_2O_3$ is more than 23.0%, the glass is difficult to melt and mold, and the coefficient of expansion is increased. On the other hand, if $Al_2O_3$ is less than 20.5%, the opacity is increased, thereby lowering the transparency. Therefore the content of $Al_2O_3$ is set at 20.5 to 23.0%.

$SiO_2$:

If $SiO_2$ is more than 68.5%, the glass is difficult to melt and mold, and the opacity is increased, thereby lowering the transparency. On the other hand, if $SiO_2$ is less than 60.0%, the coefficient of expansion is reduced and the opacity is increased, thereby lowering the transparency. Therefore the content of $SiO_2$ is set at 60.0 to 68.5%.

$TiO_2$:

$TiO_2$ is an ingredient for accelerating crystallization, but if $TiO_2$ is less than 1.0%, sufficient effect cannot be obtained. On the other hand, if it is more than 7.0%, excessive crystallization is produced and devitrification during the annealing process is apt to be caused. Therefore the content of $TiO_2$ is set at 1.0 to 7.0%.

$ZrO_2$:

$ZrO_2$ is also an ingredient for accelerating crystallization but if $ZrO_2$ is more than 3.5%, it is difficult to dissolve. Therefore the content of $ZrO_2$ is set at 0 to 3.5%. Especially in order to increase the transparency, the content of $ZrO_2$ is preferably set at 1.0 to 3.5%.

$TiO_2 + ZrO_2$:

If the total amount of $TiO_2 + ZrO_2$ is less than 3.5%, sufficient crystallization accelerating effect is not obtained, thereby increasing the opacity and lowering the transparency. Thus, the intended glass ceramic cannot be obtained. On the other hand, if it is more than 7.0%, excessive crystallization is produced and devitrification during the annealing process is apt to be caused. Therefore the content of $TiO_2 + ZrO_2$ is set at 3.5 to 7.0%, preferably 4.5 to 5.0%.

$P_2O_5$:

$P_2O_5$ is an ingredient for accelerating the dissolution of $ZrO_2$ but if $P_2O_5$ is more than 4.0%, the opacity is increased, thereby lowering the transparency. Therefore the content of $P_2O_5$ is set at 0 to 4.0%.

The reason why the coloring components are restricted to the coloring components (b) having the above-described composition will now be explained in the following. The ratio of the coloring components (b) is represented by the ratio based on 100 parts of the base glass (a).

CoO:

CoO has a large absorption at a wavelength of 550 to 600 nm, and this absorption extends to the wavelength of 800 nm or more, thereby providing a heat-ray absorbing effect. However, if CoO is more than 0.02 part, the transmittance of visible radiation is excessively lowered. Therefore the content of CoO is set at 0 to 0.02 part.

$Cr_2O_3$:

$Cr_2O_3$ has an absorption in a wavelength of not less than 500 nm and in the vicinity of a wavelength of 680 nm, and assumes yellow green by itself. Use of $Cr_2O_3$ together with another coloring component can produce a gentle tone. However, if $Cr_2O_3$ is more than 0.05 part, the absorption on the wavelength of 500 nm or less becomes strong, thereby producing not the intended gentle tone but a yellowish color. Therefore the content of $Cr_2O_3$ is set at 0 to 0.05 part.

$MoO_3$:

$MoO_3$, which has an absorption in the vicinity of a wavelength of 470 nm, is effective for controlling a tone. However, if $MoO_3$ is more than 0.04 part, the absorption on the wavelength of 500 nm or less becomes strong, thereby producing not the intended tone but a reddish color. Therefore the content of $MoO_3$ is set at 0 to 0.04 part.

NiO:

NiO has substantially the same absorption as CoO. If NiO is more than 0.075 part, the absorption on the wavelength of 500 nm or less becomes strong as a whole, thereby producing not the intended tone but a reddish color. Therefore the content of NiO is set at 0 to 0.075 part.

The reason why the auxiliary coloring components are restricted to the auxiliary coloring components (c) having the above-described composition will now be explained in the following. The ratio of the auxiliary coloring components (c) is represented by the ratio based on 100 parts of the base glass (a).

Cl, Br and I are essential ingredients for obtaining the particular absorption on the wavelength between about 400 nm and 800 nm or more, and it is necessary to add at least one of them to the base glass. The total amount of auxiliary component added is not less than 0.0002 part. However, if Cl exceeds 0.6 part, Br exceeds 0.4 part and I exceeds 0.03 part, or the total amount of these auxiliary coloring components exceeds 0.7 part, the transmittance of visible radiation is unfavorably excessively lowered.

As the preferred examples of a combination of the auxiliary coloring components, the following combinations (1) to (3) will be cited:

(1) 0.3 to 0.6 part of Cl with Br+I added thereto so that the total amount of Cl+Br+I is 0.3 to 0.7 part.

(2) 0.2 to 0.4 part of Br with Cl+I added thereto so that the total amount of Cl+Br+I is 0.2 to 0.7 part.

(3) 0.0002 to 0.03 part of I with Cl+Br added thereto so that the total amount of Cl+Br+I is 0.0002 to 0.53 0.53 part.

In the case of using each ingredient singly or as the main constituent as in the combinations (1) to (3), if the amount of ingredient added is less than the respective lower limit, it is impossible to obtain the particular absorption and, hence, the intended gentle tone such as gray and bronze.

In the preparation of a batch, Cl, Br and I in the auxiliary coloring components (c) are added in the form of a compound such as a chloride, bromide, and iodide, respectively. Since these compounds decompose during the melting process and a part of them evaporates, it is necessary to add an excess of them. The ratio of the auxiliary coloring components added is different depending upon the melting method and the melting conditions, but the following ratio based on 100 parts of the base glass is substantially preferable.

| Cl | 0.8 to 3 parts |
|---|---|
| Br | 0.6 to 5 parts |
| I | 0.2 to 8 parts |

It is also possible to add to the glass ceramic a fining agent such as $As_2O_3$ and $Sb_2O_3$ in the range that does not impair the character of a given final product.

The glass ceramic being composed of $\beta$-quartz solid solution as the principal crystal phase of the present invention which is obtained from the base glass (a) is a transparent glass ceramic having a very small coefficient of expansion and very excellent thermal cracking resistance.

The present inventors studied as follows so as to provide such a low-expansion transparent glass ceramic having excellent thermal cracking resistance with a gentle tone such as gray and bronze.

A glass ceramic was produced in the same way as in the later-described examples by adding gray and bronze coloring components for commercially available soda lime colored plate glass to the base glass in accordance with the present invention. In both cases, the tone obtained was red brown, not a gentle tone such as gray and bronze.

In order to examine the cause thereof, the transmittances in the visible region of glass ceramics obtained by adding $Fe_2O_3$, NiO, CoO and Se, respectively, which are coloring components for commercially available soda lime colored plate glass, singly to the base glass having the composition shown in Table 1 were measured. As a result, it was found that in the base glass with $Fe_2O_3$ added thereto, which has an absorption mainly on the wavelength of 700 nm or more of soda lime colored plate glass, there was a slight absorption on the wavelength of 700 nm or more but the absorption on the wavelength of 500 nm or less was stronger. In other words, when the coloring component for conventional soda lime colored plate glass is added to the base glass having the composition shown in Table 1 it assumes not gray or bronze tone but a red brown color because there is almost no absorption on the wavelength of 700 nm or more by $Fe_2O_3$.

TABLE 1

| Composition of base glass | |
|---|---|
| Component | Content (wt %) |
| $SiO_2$ | 65.1 |
| $Al_2O_3$ | 22.4 |
| $Li_2O$ | 4.4 |
| $Na_2O$ | 1.5 |
| MgO | 0.7 |
| $P_2O_5$ | 1.5 |
| $TiO_2$ | 2.1 |
| $ZrO_2$ | 2.3 |
| $As_2O_5$ | 1.0 |

Therefore in order to obtain a glass ceramic having a tone such as gray and bronze, it is necessary to add a coloring component having an absorption on the wavelength of 700 nm or more to the base glass in accordance with the present invention in place of $Fe_2O_3$. When CuO, which is generally known to have an absorption on the wavelength of 700 nm or more, was examined, it was found that although it has a slight absorption on the wavelength of 700 nm or more like $Fe_2O_3$, the absorption on the wavelength of 500 nm or less is strong, so that it is impossible to obtain the desired tone by using CuO.

As a result of further studies, the present inventors have found that it is possible to obtain a particular absorption on the wavelength between about 400 nm and 800 nm or more by adding at least one selected from the group consisting of Cl, Br and I to the base glass in accordance with the present invention substantially without using $Fe_2O_3$ or CuO which is generally known to have an absorption on the wavelength of 700 nm or more. The details of the reason are not clear but it is considered that the particular absorption is obtained due to the interaction between Cl, Br or I added and $TiO_2$ contained in the base glass as a nucleating agent.

In order to control the tone, CoO, $Cr_2O_3$, CuO, $Fe_2O_3$, $MoO_3$, NiO and $V_2O_5$ were respectively added singly to the base glass having the composition shown in Table 1 and containing 0.001% of I as the auxiliary component, and the transmittance of each of the glass ceramics was measured in the same way as the above. As a result, in each of the glass ceramics with CuO, $Fe_2O_3$ and $V_2O_5$, respectively, added thereto, no particular absorption on the wavelength between about 400 nm and 800 nm or more of the blank glass ceramic, which was the base glass containing 0.001% of I as the auxiliary coloring component solely added thereto, was observed and only the absorption of the coloring component was exhibited, but in each of the base glasses with CoO, $Cr_2O_3$, $MoO_3$ and NiO, respectively, added thereto, both the absorption of the blank glass ceramic and the absorption of the coloring component were observed.

Consequently, by adding the four coloring components (b), namely, CoO, $Cr_2O_3$, $MoO_3$ and NiO and a combination of a specific amount of three auxiliary coloring components (c), namely, Cl, Br and I, the present inventors have succeeded in obtaining a glass ceramic having the intended gentle tone such as gray and bronze.

When the influence of $Fe_2O_3$ which made it impossible to obtain the particular absorption was investigated, a particular absorption was obtained by adjusting the ratio of the auxiliary coloring components (c) relative to about less than 0.06% of $Fe_2O_3$, which is generally included as impurities, and by combining a specific amount of coloring components (b), a similar glass ceramic was obtained.

A colored low-expansion transparent glass ceramic of the present invention has a very small coefficient of expansion, excellent thermal cracking resistance, and a gentle tone such as gray and bronze. Thus, it is very useful for building and automotive windowpanes.

The present invention will be explained in more detail with reference to the following examples and comparative examples. It is to be understood that the present invention is not restricted to those examples within the scope of the invention.

EXAMPLES 1 to 22 AND COMPARATIVE EXAMPLES 1 TO 4

The raw material so prepared as to have a composition shown in Table 2 (the ratios of the coloring components and the auxiliary coloring components are based on 100 parts of the base glass, and an excess of auxiliary coloring component was added so that the content in the glass ceramic produced was a ratio shown in Table 2 in consideration of the evaporation during the melting process) was melted at 1,550° C. in a platinum crucible, cast in a mold and annealed to obtain a sample glass ceramic. The sample glass ceramic was crystallized by two-stage heat treating condition, namely, at 780° C. for 4 hours and at 840° C. for 4 hours. It was confirmed through X-ray analysis that the principal crystalline phase of each glass ceramic was a $\beta$-quartz solid solution.

The coefficient of linear expansion ($\alpha_{100}$ to $\alpha_{800}$) in a temperature range of 100° to 800° C. of each of the glass ceramics obtained is shown in Table 2. The samples were ground to a thickness of 5 mm and polished. The optical characteristics of each of the polished samples measured at an angle of field of 2° by using a standard light source c are also shown in Table 2.

Commercially available bronze soda lime glass and gray soda lime glass were used in Comparative Examples 3 and 4. The glass ceramics in Comparative Examples 1 and 2 were obtained by adding the same coloring components as in Comparative Examples 3 and 4 to the same base glass as in Examples 1 to 22.

As is clear from Table 2, glass ceramics in Examples 1 to 22 have coefficients of linear expansion by not less than ten times smaller than those of the glass ceramics in Comparative Examples 3 and 4, and similar general tones to those of the glass ceramics in Comparative Examples 3 and 4, namely, tones having a small excitation purity. On the other hand, in Comparative Examples 1 and 2, it is impossible to obtain glass ceramics having a gentle tone.

While there has been described what are at present considered to be preferred embodiments of the invention, it will be understood that various modifications may be made thereto, and it is intended that the appended claims cover all such modifications as fall within the true spirit and scope of the invention.

TABLE 2 - 1

| | Example | 1 | 2 | 3 | 4 | 5 |
|---|---|---|---|---|---|---|
| Composition of base glass (%) | $Li_2O$ | 4.4 | Same | Same | Same | Same |
| | $Na_2O$ | 1.5 | as | as | as | as |
| | $K_2O$ | — | left | left | left | left |
| | MgO | 0.7 | | | | |
| | CaO | — | | | | |
| | $Al_2O_3$ | 22.4 | | | | |
| | $SiO_2$ | 65.1 | | | | |
| | $TiO_2$ | 2.1 | | | | |
| | $ZrO_2$ | 2.3 | | | | |
| | $P_2O_5$ | 1.5 | | | | |
| | Total | 100 | | | | |
| Composition of coloring component and auxiliary coloring component (part) | Cl | 0.46 | 0.46 | 0.44 | 0.45 | |
| | Br | | | | | 0.29 |
| | I | | | | | |
| | CoO | | 0.003 | 0.003 | | 0.005 |
| | $Cr_2O_3$ | 0.002 | 0.007 | 0.005 | 0.002 | 0.0075 |

TABLE 2 - 1-continued

|  |  | | | | | |
|---|---|---|---|---|---|---|
|  | $Fe_2O_3$ | | | | | |
|  | NiO | 0.006 | | | | |
|  | $MoO_3$ | | | | 0.006 | |
| Properties | Tone of transmission light | Bronze | Dark green | Gray | Bronze | Gray |
|  | Dominant wavelength (nm) | 575 | 573 | 475 | 578 | 580 |
|  | Transmittance of visible radiation (%) | 65.8 | 60.6 | 43.5 | 62.6 | 45.6 |
|  | Excitation purity (%) | 3.5 | 9.6 | 2.4 | 7.4 | 2.4 |
|  | Coefficient of linear expansion (100-800° C.) ($K^{-1}$) | $3 \times 10^{-7}$ | $3 \times 10^{-7}$ | $4 \times 10^{-7}$ | $3 \times 10^{-7}$ | $3 \times 10^{-7}$ |

|  | Example | 6 | 7 | 8 | 9 | 10 | 11 |
|---|---|---|---|---|---|---|---|
| Composition of base glass (%) | $Li_2O$ | Same as left | Same as left | Same as left | Same as left | Same as left | Same as left |
|  | $Na_2O$ | | | | | | |
|  | $K_2O$ | | | | | | |
|  | MgO | | | | | | |
|  | CaO | | | | | | |
|  | $Al_2O_3$ | | | | | | |
|  | $SiO_2$ | | | | | | |
|  | $TiO_2$ | | | | | | |
|  | $ZrO_2$ | | | | | | |
|  | $P_2O_5$ | | | | | | |
|  | Total | | | | | | |
| Composition of coloring component and auxiliary coloring component (part) | Cl | | | | | | |
|  | Br | 0.26 | 0.34 | | | | |
|  | I | | | 0.001 | 0.002 | 0.003 | 0.003 |
|  | CoO | | 0.005 | | | 0.005 | 0.005 |
|  | $Cr_2O_3$ | 0.002 | 0.01 | 0.002 | 0.002 | 0.01 | 0.0075 |
|  | $Fe_2O_3$ | | | | | | |
|  | NiO | 0.01 | | 0.006 | 0.010 | | |
|  | $MoO_3$ | | | | | | |
| Properties | Tone of transmission light | Bronze | Dark green | Gray | Bronze | Gray | Bronze |
|  | Dominant wavelength (nm) | 580 | 574 | 587 | 580 | 569 | 579 |
|  | Transmittance of visible radiation (%) | 60 | 44.9 | 69.3 | 60.0 | 37.9 | 45.0 |
|  | Excitation purity (%) | 3.5 | 6.8 | 1.6 | 3.5 | 2.6 | 2.1 |
|  | Coefficient of linear expansion (100-800° C.) ($K^{-1}$) | $4 \times 10^{-7}$ | $4 \times 10^{-7}$ | $3 \times 10^{-7}$ | $3 \times 10^{-7}$ | $3 \times 10^{-7}$ | $3 \times 10^{-7}$ |

TABLE 2 - 2

|  | Example | 12 | 13 | 14 | 15 | 16 | 17 |
|---|---|---|---|---|---|---|---|
| Composition of base glass (%) | $Li_2O$ | 4.4 | Same as left | Same as left | Same as left | Same as left | Same as left |
|  | $Na_2O$ | 1.5 | | | | | |
|  | $K_2O$ | — | | | | | |
|  | MgO | 0.7 | | | | | |
|  | CaO | — | | | | | |
|  | $Al_2O_3$ | 22.4 | | | | | |
|  | $SiO_2$ | 65.1 | | | | | |
|  | $TiO_2$ | 2.1 | | | | | |
|  | $ZrO_2$ | 2.3 | | | | | |
|  | $P_2O_5$ | 1.5 | | | | | |
|  | Total | 100 | | | | | |
| Composition of coloring component and auxiliary coloring component (part) | Cl | 0.39 | 0.31 | 0.10 | 0.27 | 0.20 | 0.09 |
|  | Br | 0.10 | 0.16 | 0.22 | | | |
|  | I | | | | 0.001 | 0.002 | 0.004 |
|  | CoO | 0.004 | | 0.004 | 0.004 | 0.005 | 0.004 |
|  | $Cr_2O_3$ | 0.005 | 0.001 | 0.005 | 0.005 | 0.0075 | 0.005 |
|  | $Fe_2O_3$ | | | | | | |
|  | NiO | | | | 0.002 | | 0.006 |
|  | $MoO_3$ | | 0.006 | | | | |
| Properties | Tone of transmission light | Gray | Bronze | Bronze | Dark green | Gray | Bronze |
|  | Dominant wavelength (nm) | 587 | 589 | 578 | 571 | 580 | 583 |
|  | Transmittance of visible radiation (%) | 51.0 | 56.2 | 69.0 | 70.3 | 46.3 | 54.5 |
|  | Excitation purity (%) | 1.3 | 3.5 | 8.6 | 8.0 | 2.4 | 5.0 |
|  | Coefficient of linear expansion (100-800° C.) ($K^{-1}$) | $3 \times 10^{-7}$ | $3 \times 10^{-7}$ | $4 \times 10^{-7}$ | $3 \times 10^{-7}$ | $3 \times 10^{-7}$ | $3 \times 10^{-7}$ |

|  | Example | 18 | 19 | 20 | 21 | 22 |
|---|---|---|---|---|---|---|
| Composition of base glass (%) | $Li_2O$ | Same as left | Same as left | Same as left | Same as left | Same as left |
|  | $Na_2O$ | | | | | |
|  | $K_2O$ | | | | | |
|  | MgO | | | | | |
|  | CaO | | | | | |
|  | $Al_2O_3$ | | | | | |
|  | $SiO_2$ | | | | | |
|  | $TiO_2$ | | | | | |

TABLE 2 - 2-continued

|  |  |  |  |  |  |  |
|---|---|---|---|---|---|---|
|  | $ZrO_2$ |  |  |  |  |  |
|  | $P_2O_5$ |  |  |  |  |  |
|  | Total |  |  |  |  |  |
| Composition of | Cl |  |  |  | 0.35 | 0.10 |
| coloring component | Br | 0.33 | 0.15 | 0.07 | 0.12 | 0.23 |
| and auxiliary | I | 0.001 | 0.002 | 0.004 | 0.001 | 0.004 |
| coloring component | CoO | 0.004 | 0.004 | 0.004 |  | 0.005 |
| (part) | $Cr_2O_3$ | 0.005 | 0.005 | 0.005 | 0.002 | 0.010 |
|  | $Fe_2O_3$ |  |  |  |  |  |
|  | NiO |  |  |  |  |  |
|  | $MoO_3$ | 0.006 |  |  | 0.006 |  |
| Properties | Tone of transmission light | Bronze | Dark blue | Bronze | Bronze | Dark blue |
|  | Dominant wavelength (nm) | 576 | 567 | 583 | 578 | 479 |
|  | Transmittance of visible radiation (%) | 72.5 | 61.5 | 43.8 | 62.6 | 20.8 |
|  | Excitation purity (%) | 10.2 | 5.4 | 11.3 | 7.4 | 10.6 |
|  | Coefficient of linear expansion (100–800° C.) ($K^{-1}$) | $3 \times 10^{-7}$ | $4 \times 10^{-7}$ | $3 \times 10^{-7}$ | $3 \times 10^{-7}$ | $3 \times 10^{-7}$ |

TABLE 2 - 3

|  | Comparative Example | 1 | 2 | 3 | 4 |
|---|---|---|---|---|---|
| Composition of | $Li_2O$ | 4.4 | Same | — | Same |
| base glass (%) | $Na_2O$ | 1.5 | as | 13.1 | as |
|  | $K_2O$ | — | left | 0.9 | left |
|  | MgO | 0.7 |  | 3.7 |  |
|  | CaO | — |  | 9.2 |  |
|  | $Al_2O_3$ | 22.4 |  | 1.4 |  |
|  | $SiO_2$ | 65.1 |  | 71.7 |  |
|  | $TiO_2$ | 2.1 |  | — |  |
|  | $ZrO_2$ | 2.3 |  | — |  |
|  | $P_2O_5$ | 1.5 |  | — |  |
|  | Total | 100 |  | 100 |  |
| Composition of | Cl |  |  |  |  |
| coloring component | Br |  |  |  |  |
| and auxiliary | I |  |  |  |  |
| coloring component | CoO | 0.003 | 0.004 | 0.003 | 0.004 |
| (part) | $Cr_2O_3$ |  |  |  |  |
|  | $Fe_2O_3$ | 0.18 | 0.19 | 0.18 | 0.19 |
|  | NiO | 0.008 | 0.01 | 0.008 | 0.01 |
|  | $MoO_3$ | 0.001 | 0.0007 | 0.001 | 0.0007 |
| Properties | Tone of transmission light | Red brown | Red brown | Bronze | Gray |
|  | Dominant wavelength (nm) | 582 | 578 | 582 | 580 |
|  | Transmittance of visible radiation (%) | 62.8 | 61.1 | 62.3 | 63.1 |
|  | Excitation purity (%) | 19.4 | 20.5 | 4.2 | 1.4 |
|  | Coefficient of linear expansion (100–800° C.) ($K^{-1}$) | $3 \times 10^{-7}$ | $3 \times 10^{-7}$ | $98 \times 10^{-7}$ | $96 \times 10^{-7}$ |

What is claimed is:

1. A colored low-expansion transparent glass ceramic comprising 100 parts by weight of a base glass (a) formed of following weight% of components, following part by weight of coloring components (b) and 0.0002 to 0.7 part by weight of following auxiliary coloring components (c) mixed thereto, said glass ceramic having a $\beta$-quartz solid solution as the principal crystalline phase, coefficient of linear expansion of $-10 \times 10^{-7}$ to $10 \times 10^{-7}$ ($K^{-1}$) in a temperature range of 100° to 800° C. and excitation purity between 1.3 and 11.3%:

(a) Base glass

| | ([part by] weight %) |
|---|---|
| $Li_2O$ | 3.5 to 5.5 |
| $Na_2O$ | 0 to 4.0 |
| $K_2O$ | 0 to 4.0 |
| $Na_2O + K_2O$ | 0.5 to 4.0 |
| MgO | 0.1 to 3.0 |
| $Al_2O_3$ | 20.5 to 23.0 |
| $SiO_2$ | 60.0 to 68.5 |
| $TiO_2$ | 1.0 to 7.0 |
| $ZrO_2$ | 0 to 3.5 |
| $TiO_2 + ZrO_2$ | 3.5 to 7.0 |
| $P_2O_5$ | 0 to 4.0 |

(b) Coloring components

| | (part by weight) |
|---|---|
| CoO | 0 to 0.02 |
| $Cr_2O_3$ | 0 to 0.05 |
| $MoO_3$ | 0 to 0.04 |
| NiO | 0 to 0.075 |

(c) Auxiliary coloring components
   at least one member selected from the group consisting of

| | (part by weight) |
|---|---|
| Cl | 0 to 0.6 |
| Br | 0 to 0.4, and |

| (part by weight) |
|---|
| I | 0 to 0.03 |

2. A glass ceramic according to claim 1, wherein the MgO content in said base glass (a) is not more than 2 wt%.

3. A glass ceramic according to claim 1, wherein the total amount of $TiO_2$ and $ZrO_2$ in said base glass (a) is 4.5 to 5.0 wt%.

4. A glass ceramic according to claim 1, wherein said auxiliary coloring component (c) is composed of 0.3 to 0.6 part by weight of Cl with Br and I added thereto so that the total amount of Cl, Br and I is 0.3 to 0.7 part by weight.

5. A glass ceramic according to claim 1, wherein said auxiliary coloring component (c) is composed of 0.2 to 0.4 part by weight of Br with Cl and I added thereto so that the total amount of Cl, Br and I is 0.2 to 0.7 part by weight.

6. A glass ceramic according to claim 1, wherein said auxiliary coloring component (c) is composed of 0.002 to 0.03 part by weight of I with Cl and Br added thereto so that the total amount of Cl, Br and I is 0.002 to 0.53 part by weight.

7. A glass ceramic according to claim 1, wherein transmittance of visible radiation is between 20.8 and 72.5 %.

8. A glass ceramic according to claim 7, wherein said transmittance of visible radiation is under 60%.

9. A glass ceramic according to claim 1, wherein dominant wavelength is between 475 and 589 nm.

10. A glass ceramic according to claim 1, wherein tone of transmission light is bronze, dark green, gray or dark blue.

* * * * *